(12) United States Patent
Wang et al.

(10) Patent No.: US 11,204,185 B2
(45) Date of Patent: Dec. 21, 2021

(54) METHOD FOR PRODUCING SILENCING DEVICE, SILENCING DEVICE AND AIR PURIFIER

(71) Applicants: BEIJING XIAOMI MOBILE SOFTWARE CO., LTD., Beijing (CN); BEIJING SMARTMI TECHNOLOGY CO., LTD., Beijing (CN)

(72) Inventors: Yi Wang, Beijing (CN); Lei Jia, Beijing (CN); Yan Gao, Beijing (CN)

(73) Assignees: Beijing Xiaomi Mobile Software Co., Ltd., Beijing (CN); Beijing Smartmi Technology Co., Ltd., Beijing (CN)

(*) Notice: Subject to any disclaimer, the term of this patent is extended or adjusted under 35 U.S.C. 154(b) by 509 days.

(21) Appl. No.: 16/206,171

(22) Filed: Nov. 30, 2018

(65) Prior Publication Data

US 2019/0170393 A1 Jun. 6, 2019

(30) Foreign Application Priority Data

Dec. 4, 2017 (CN) .......................... 201711258008.8

(51) Int. Cl.
*F24F 13/24* (2006.01)
*G10K 11/162* (2006.01)
(Continued)

(52) U.S. Cl.
CPC ................ *F24F 13/24* (2013.01); *F24F 3/16* (2013.01); *F24F 13/0245* (2013.01);
(Continued)

(58) Field of Classification Search
CPC ........ F24F 13/24; F24F 3/16; F24F 2013/242; F24F 13/0245; G10K 11/161; G10K 11/162
(Continued)

(56) References Cited

U.S. PATENT DOCUMENTS 6,332,511 B1 12/2001 Parlato
2006/0272886 A1* 12/2006 Mueller .................... F02C 7/24
181/224

(Continued)

FOREIGN PATENT DOCUMENTS

CN 104863819 A 8/2015
CN 204830400 U 12/2015
(Continued)

OTHER PUBLICATIONS

European Search Report in European application No. EP18210012.3, dated May 3, 2019, 8 pages.
(Continued)

*Primary Examiner* — Forrest M Phillips
(74) *Attorney, Agent, or Firm* — Arch & Lake LLP

(57) ABSTRACT

A silencing device, an air purifier, and a method for producing the same are provided. The method includes that: a sound wave spectrum when an air purifier to be silenced performs operations is acquired; a frequency value, which exceeds a sound wave frequency limit for the air purifier, of the sound wave spectrum is calculated; and a silencing device adapted to the air purifier to be silenced is produced according to the frequency value. At least one structural parameter of the silencing device is configured according to the frequency value. The silencing device is configured to reduce a sound with the frequency value exceeding the sound wave frequency limit.

13 Claims, 5 Drawing Sheets

(51) Int. Cl.
  *F24F 3/16* (2021.01)
  *G10K 11/16* (2006.01)
  *F24F 13/02* (2006.01)
  *F16L 55/033* (2006.01)

(52) U.S. Cl.
  CPC .......... G10K 11/161 (2013.01); G10K 11/162 (2013.01); *F16L 55/0336* (2013.01); *F24F 2013/242* (2013.01)

(58) Field of Classification Search
  USPC .......................................................... 181/224
  See application file for complete search history.

(56) References Cited

U.S. PATENT DOCUMENTS

| | | | | |
|---|---|---|---|---|
| 2010/0077755 | A1* | 4/2010 | Jangili | F16L 55/02754 60/725 |
| 2011/0088966 | A1* | 4/2011 | Geyer, III | F01N 1/082 181/224 |
| 2011/0168482 | A1* | 7/2011 | Merchant | F02C 7/045 181/213 |
| 2016/0066699 | A1* | 3/2016 | Rydsund | A47C 19/022 5/53.1 |
| 2016/0102786 | A1* | 4/2016 | Iwasaki | B29C 51/105 181/224 |
| 2016/0118034 | A1 | 4/2016 | Qian | |
| 2016/0195299 | A1* | 7/2016 | Lind | F24F 7/065 181/224 |
| 2017/0101970 | A1 | 4/2017 | Zhang | |
| 2020/0224898 | A1* | 7/2020 | Zambolin | F24F 7/065 |

FOREIGN PATENT DOCUMENTS

| | | |
|---|---|---|
| CN | 105823140 A | 8/2016 |
| CN | 106057190 A | 10/2016 |
| CN | 106801988 A | 6/2017 |
| CN | 106894871 A | 6/2017 |
| CN | 106940052 A | 7/2017 |
| CN | 107101353 A | 8/2017 |
| CN | 107170436 A | 9/2017 |
| CN | 107178673 A | 9/2017 |
| EP | 3153681 A1 | 4/2017 |
| KR | 20140051203 A | 4/2014 |

OTHER PUBLICATIONS

First Office Action of the Chinese Application No. 201711258008.8, dated Aug. 30, 2019 and English translation, (18p).

Gao, Feng, et al., "Resonance Absorption Structure", Foundation of Building Materials Science, published on Aug. 31, 2016, http://img.duxiu.com/n/print.jsp, (6p).

* cited by examiner

DRAWINGS FOR SPECIFICATION

```
┌─────────────────────────────────────────┐
│ A sound wave spectrum when an air       │
│ purifier to be silenced performs        │──── S101
│ operations is acquired                  │
└─────────────────────────────────────────┘
                    │
                    ▼
┌─────────────────────────────────────────┐
│ A frequency value, which exceeds a      │
│ sound wave frequency limit for the air  │──── S103
│ purifier, of the sound wave spectrum    │
│ is calculated                           │
└─────────────────────────────────────────┘
                    │
                    ▼
┌─────────────────────────────────────────┐
│ A silencing device adapted to the air   │
│ purifier to be silenced is produced     │
│ according to the frequency value, at    │
│ least one structural parameter of the   │──── S105
│ silencing device being configured       │
│ according to the frequency value and    │
│ the silencing device being configured   │
│ to reduce a sound with the frequency    │
│ value exceeding the sound wave          │
│ frequency limit                         │
└─────────────────────────────────────────┘
```

FIG. 1

METHOD FOR PRODUCING SILENCING DEVICE, SILENCING DEVICE AND AIR PURIFIER

This application is filed based upon and claims priority from Chinese Patent Application No. CN201711258008.8, filed on Dec. 4, 2017, the entire contents of which are incorporated herein by reference.

TECHNICAL FIELD

The present disclosure generally relates to the technical field of household electrical appliances, and more particularly, to a method for producing a silencing device, the silencing device and an air purifier.

BACKGROUND

Air pollution problems are non-ignorable. In recent years, serious haze pollution exists in many cities in China. People cannot ensure freshness and cleanness of indoor air by ventilation in most of time. In addition. Various problems such as excessive indoor formaldehyde, spreading of microbial viruses and bacteria and air conditioner syndrome seriously influence indoor air quality. Severe indoor air pollution brings serious influence to breathing and health of people and seriously threatens physical and mental health of people. People pay more and more attentions to indoor air pollution prevention.

For dealing with the problem of indoor air pollution caused by decoration pollution and urban air pollution, an air purifier is adopted by more and more Chinese families and becomes an emerging household electrical appliance. However, a present air purifier generally has the problem of noise pollution. Noise not only has hazards of disturbing sleep and impairing hearing but also has non-ignorable influence on health. The World Health Organization believes that environmental noise is a threat to public health and has adverse impact on physical and mental health of a person. Noise higher than 40 dB may bring the problems of conscious sleep disorder, environmental insomnia and the like. Noise higher than 55 dB may increase a risk of a person in suffering from a cardiovascular disease. Noise caused by operations of an air purifier is generally higher than 50 dB. Therefore, for creating a comfortable and quite indoor environment, effectively eliminating a noise produced by an air purifier is particularly important.

SUMMARY

According to a first aspect of the present disclosure, there is provided a method for producing a silencing device, comprising: acquiring a sound wave spectrum when an air purifier to be silenced performs operations; calculating a frequency value, which exceeds a sound wave frequency limit for the air purifier, of the sound wave spectrum; and producing a silencing device adapted to the air purifier to be silenced according to the frequency value, at least one structural parameter of the silencing device being configured according to the frequency value and the silencing device being configured to reduce a sound with the frequency value exceeding the sound wave frequency limit.

According to a second aspect of the present disclosure, there is provided a silencing device, comprising: a sound insulation mesh plate and silencing cotton attached to the sound insulation mesh plate, wherein a plurality of meshes are formed in the sound insulation mesh plate, and the silencing cotton is located on an air outlet side of each mesh, wherein the sound insulation mesh plate and the silencing cotton is cooperatively configured to reduce a sound with the frequency value which exceeds the sound wave frequency limit for the air purifier.

According to a third aspect of the present disclosure, there is provided a n air purifier, comprising: a housing, an air inlet, an air outlet, a fan module and the silencing device, wherein the air inlet is formed in a peripheral lateral surface of a lower part of the housing, the air outlet is formed in a top of the housing, an air duct structure is formed between the air inlet and the air outlet, the fan module is located in the air duct structure, the silencing device is mounted within the air duct structure between the fan module and the air outlet, and the silencing device is configured to reduce at least a frequency value, which exceeds a sound wave frequency limit for the air purifier, of a sound wave spectrum in the air purifier.

It is to be understood that the above general descriptions and detailed descriptions below are only exemplary and explanatory and not intended to limit the present disclosure.

BRIEF DESCRIPTION OF THE DRAWINGS

FIG. 1 is a flow chart illustrating a method for producing a silencing device according to an example of the present disclosure;

DETAILED DESCRIPTION

Figure 2:
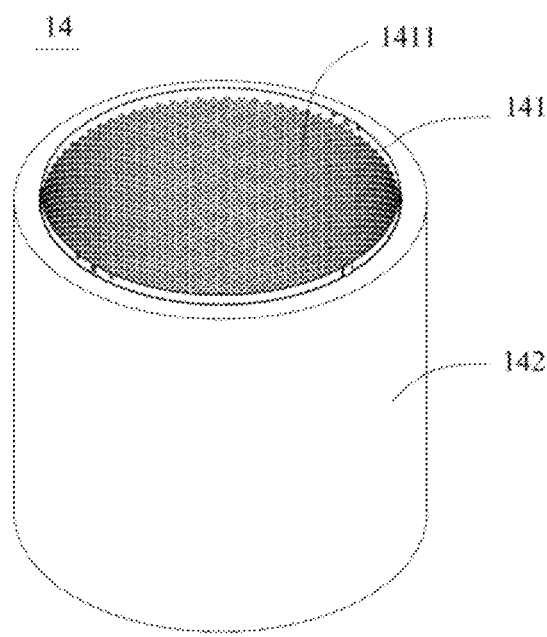
FIG. 2 is a diagram illustrating a structure of a silencing device according to an example of the present disclosure.

The present disclosure will be described below in conjunction with specific implementations illustrated in the drawings in detail. However, these implementations are not intended to limit the present disclosure. Alternatives made by those of ordinary skilled in the art to structures, methods or functions according to these implementations shall fall within the scope of protection of the present disclosure.

Terms used in the present disclosure are not intended to limit the present disclosure but only to describe purposes of specific embodiments. "a", "said" and "the", in a singular form, used in the present disclosure and the appended claims are also intended to include a plural form, unless other meanings are specifically stated in the context. It is also to be understood that term "and/or" used in the present disclosure refers to and includes any one or all possible combinations of one or more associated items which are listed.

Some implementations of the present disclosure will be described below in combination with the drawings in detail. The following embodiments and characteristics in the embodiments may be combined if there are no conflicts.

As illustrated in FIG. 1, FIG. 1 is a flow chart illustrating a method for producing a silencing device according to an example of the present disclosure. The method for producing the silencing device includes the following steps.

In S101, a sound wave spectrum when an air purifier to be silenced performs operations is acquired. For example, the air purifier may include one or more sensors to detect the sound wave spectrum generated by the air purifier. While the air purifier is used as an example in this disclosure, other hardware devices may adopt the method for producing a similar silencing device to reduce noise of the hardware devices. The other hardware devices may include vacuum machine, smart cleaner, smart fans, etc.

In the present disclosure, noise reduction is implemented in a limited space within the air purifier mainly by absorbing a protruding high-frequency cuspidal frequency band. Here, the sound wave spectrum when the air purifier performs operations may be acquired through a decibel detection sensor arranged in the air purifier. The sound wave spectrum is formed by multiple sound wave frequency bands.

In S103, a frequency value, which exceeds a sound wave frequency limit for the air purifier, of the sound wave spectrum is calculated. The air purifier may include a processor configured to calculated the frequency value within the sound wave spectrum, where the frequency value exceeds the sound wave frequency limit for the air purifier. The sound wave frequency limit may be a value preset in the air purifier. Alternatively or additionally, the sound wave frequency limit may be adjusted or set by a user using a smart device connected to the air purifier.

In S105, a silencing device adapted to the air purifier to be silenced is produced according to the frequency value. At least one structural parameter of the silencing device is configured according to the frequency value and the silencing device is configured to reduce a sound with the frequency value exceeding the sound wave frequency limit.

In the example, for implementing noise reduction when the air purifier performs operations, a sound wave higher than the sound wave frequency limit in the sound wave spectrum is absorbed. Specifically, the sound wave frequency limit is preset according to a grade of an actual product or the group targeted by the product. Then, the frequency value, exceeding the sound wave frequency limit of the air purifier, of a sound wave frequency is calculated. The frequency value of the part is a sound on which noise reduction is required to be performed.

In the present disclosure, the silencing device is arranged in the air purifier. The silencing device is located in an air duct structure of the air purifier. The silencing device may be configured to reduce the frequency value exceeding the sound wave frequency limit. Specifically, the silencing device includes a sound insulation mesh plate and silencing cotton attached to the sound insulation mesh plate. A plurality of meshes are formed in the sound insulation mesh plate. The silencing cotton is located on an air outlet side of each mesh. Here, a sound wave frequency f absorbed by the silencing device is equal to the frequency value. The at least one structural parameter of the silencing device includes a mesh area of the sound insulation mesh plate, a silencing cotton volume corresponding to each mesh and a depth of each mesh.

In the present disclosure, the sound wave frequency f absorbed by the silencing device is expressed as $$f = \frac{C}{2\pi}\sqrt{\frac{A}{VL}}.$$

Here, C is a sound velocity in the air purifier, A is the mesh area of the sound insulation mesh plate, V is the silencing cotton volume corresponding to each mesh and L is the depth of each mesh (or a wall thickness of the sound insulation mesh plate). V is the silencing cotton volume corresponding to each mesh, which is obtained by dividing the volume of the silencing cotton corresponding to all the meshes by the total number of the meshes in the sound insulation mesh plate. Preferably, the meshes in the sound insulation mesh plate have the same mesh area and are uniformly distributed.

In one or more embodiments, the sound wave frequency f is closely related to the mesh area A, the depth L of each mesh and the silencing cotton volume V corresponding to each mesh. When there is made a requirement of absorbing different sound wave frequencies, different mesh areas A, different mesh depths L and different silencing cotton volumes V corresponding to the meshes in the sound insulation mesh plate may be set for adaptation, thereby achieving a purpose of noise reduction. In the embodiment, the mesh area A is ranged from $0.0625\pi mm^2$ to $100\pi mm^2$, the depth L of each mesh is ranged from 0.2 mm to 5 mm, and a thickness of the silencing cotton is ranged from 0.1 mm to 100 mm. The silencing cotton volume V corresponding to each mesh is related to the total number of the meshes and the thickness of the silencing cotton.

In an example, the sound insulation mesh plate may be a plate body structure located in the air duct structure of the air purifier, and the silencing cotton is located on a side, which is opposite to the air duct structure, of the sound insulation mesh plate. Here, the airflow within the air duct structure flows through a plate surface of the sound insulation mesh plate. That is, the sound insulation mesh plate may be a structure such as a straight plate, a curve plate or a bent plate, and the sound insulation mesh plate performs absorption noise treatment on the airflow in a certain direction on an inner wall of the air duct structure. Here, the meshes in the sound insulation mesh plate may be round meshes, square meshes or polygonal meshes and are uniformly distributed in the sound insulation mesh plate. Therefore, the process is more convenient in perforation, and convenience is brought to machining.

In another alternative example, the sound insulation mesh plate is a closed structure, the silencing cotton is positioned on an outer surface of the closed structure, an inner cavity of the closed structure forms a part of the air duct structure of the air purifier, and an extending direction of a central axis of the sound insulation mesh plate is the same as the flowing direction of air within the air duct structure. The plurality of meshes are formed in the sound insulation mesh plate. Here, the sound insulation mesh plate may be cylindrical, triangular prism-shaped, rectangular prism-shaped, polygonal prism-shaped or the like. The inner cavity of the sound insulation mesh plate forms a part of the air duct structure, and the meshes in the sound insulation mesh plate may be round meshes, square meshes or polygonal meshes and are uniformly distributed in the sound insulation mesh plate. Therefore, the process is more convenient in perforation, and convenience is brought to machining. The embodiment has a better silencing effect, and the embodiment is preferably adopted in the present disclosure.

According to the method of the present disclosure for producing the silencing device, the silencing device capable of reducing the frequency value exceeding the sound wave frequency limit is produced according to the frequency value exceeding the sound wave frequency limit to implement noise reduction treatment in the air purifier.

Figure 3:
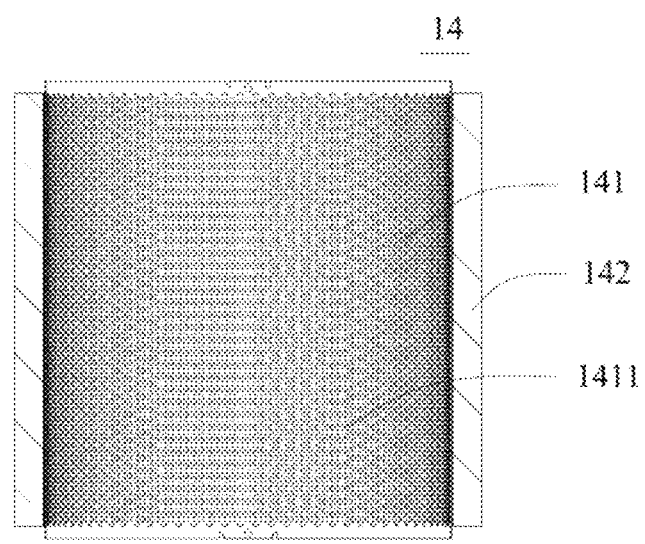
FIG. 3 is a schematic cross-section view illustrating a silencing device according to an example of the present disclosure.

As illustrated in FIGS. 2 and 3, according to another aspect of the present disclosure, a silencing device 14 is also provided. The silencing device 14 includes a sound insulation mesh plate 141 and silencing cotton 142 attached to the sound insulation mesh plate 141. Here, multiple meshes 1411 are formed in the sound insulation mesh plate 141, and the silencing cotton 142 is located on an air outlet side of each mesh 1411. According to the silencing device 14 of the present disclosure, the sound insulation mesh plate 141 and the silencing cotton 142 are cooperatively configured to reduce a sound with the frequency value which exceeds the sound wave frequency limit for the air purifier. Here, the sound insulation mesh plate 141 may be assembled in the air purifier 100 in a matching manner through a limiting groove position in the air purifier 100, and may also be fixed in the air purifier 100 through a connecting piece (e.g., a screw, a clamping hook or the like).

A sound wave frequency f absorbed by the silencing device 14 is equal to the frequency value, and the structural parameters of the silencing device 14 includes a mesh area of the sound insulation mesh plate 141, the volume of a silencing cotton 142 corresponding to each mesh 1411 and a depth of each mesh 1411.

For example, f is expressed as $$f = \frac{C}{2\pi}\sqrt{\frac{A}{VL}}.$$

Here, C is a sound velocity within the air purifier 100, A is the mesh area of the sound insulation mesh plate 141, V is the volume of the silencing cotton 142 corresponding to each mesh 1411 and L is the depth of each mesh (or a wall thickness of the sound insulation mesh plate). V is the volume of the silencing cotton 142 corresponding to each mesh 1411, which is obtained by dividing the volume of the silencing cotton 142 corresponding to all the meshes 1411 by the total number of the meshes 1411 in the sound insulation mesh plate 141. Preferably, the meshes 1411 in the sound insulation mesh plate 141 have the same mesh area and are uniformly distributed.

In one or more embodiments, the sound wave frequency f is closely related to the mesh area A, the depth L of each mesh and the volume V of the silencing cotton 142 corresponding to each mesh 1411. When there is made a requirement of absorbing different sound wave frequencies, different mesh areas A, different mesh depths L and different silencing cotton 142 regions V corresponding to the meshes 1411 in the sound insulation mesh plate 141 may be set for adaptation, thereby achieving a purpose of noise reduction. In the embodiment, the mesh area A is ranged from $0.0625\pi mm^2$ to $100\pi mm^2$, the depth L of each mesh is ranged from 0.2 mm to 5 mm, and the thickness of the silencing cotton 142 is ranged from 0.1 mm to 100 mm. The silencing cotton 142 region V corresponding to each mesh 1411 is related to the number of the meshes 1411 and the thickness of the silencing cotton 142.

In an alternative example, the sound insulation mesh plate 141 may be a plate body structure located in an air duct structure 13 of the air purifier 100. The silencing cotton 142 is located on a side, which is opposite to the air duct structure 13, of the sound insulation mesh plate 141. Here, the airflow within the air duct structure 13 flows through a plate surface of the sound insulation mesh plate 141. That is, the sound insulation mesh plate 141 may be a structure such as a straight plate, a curve plate and a bent plate, and the sound insulation mesh plate 141 performs absorption noise treatment on the airflow in a certain direction on an inner wall of the air duct structure 13. Here, the meshes 1411 in the sound insulation mesh plate 141 may be round meshes, square meshes or polygonal meshes and are uniformly distributed in the sound insulation mesh plate 141. Therefore, the process is more convenient in perforation, and convenience is brought to machining.

In another alternative example, the sound insulation mesh plate 141 is a closed structure. The silencing cotton 142 is positioned on an outer surface of the closed structure. An inner cavity of the closed structure forms a part of the air duct structure 13 of the air purifier 100. An extending direction of a central axis of the sound insulation mesh plate 141 is the same as a flowing direction of air within the air duct structure 13. The multiple meshes 1411 are formed in the sound insulation mesh plate 141. Here, the sound insulation mesh plate 141 may be cylindrical, triangular prism-shaped, rectangular prism-shaped, polygonal prism-shaped or the like. The inner cavity of the sound insulation mesh plate 141 forms a part of the air duct structure 13. The meshes 1411 in the sound insulation mesh plate 141 may be round meshes, square meshes or polygonal meshes and are uniformly distributed in the sound insulation mesh plate 141. Therefore, the process is more convenient in perforation, and convenience is brought to machining. The embodiment has a better silencing effect, and the embodiment is preferably adopted in the present disclosure.

In the present disclosure, since a sound is propagated from bottom to top and the sound insulation mesh plate 141 is at least partially disposed in the air duct structure 13, a capability of the silencing device 14 in absorbing the sound wave frequency f may further be improved by increasing the number of the meshes in the sound insulation mesh plate 141 and/or increasing the stroke of the sound insulation mesh plate 141 in the air duct structure 13 on the premise of meeting an application environment (i.e., a height limit due to the air purifier 100).

According to the present disclosure, the silencing device capable of reducing a frequency value exceeding a sound wave frequency limit is produced according to the frequency value exceeding the sound wave frequency limit to implement noise reduction treatment in the air purifier.

Figure 4:
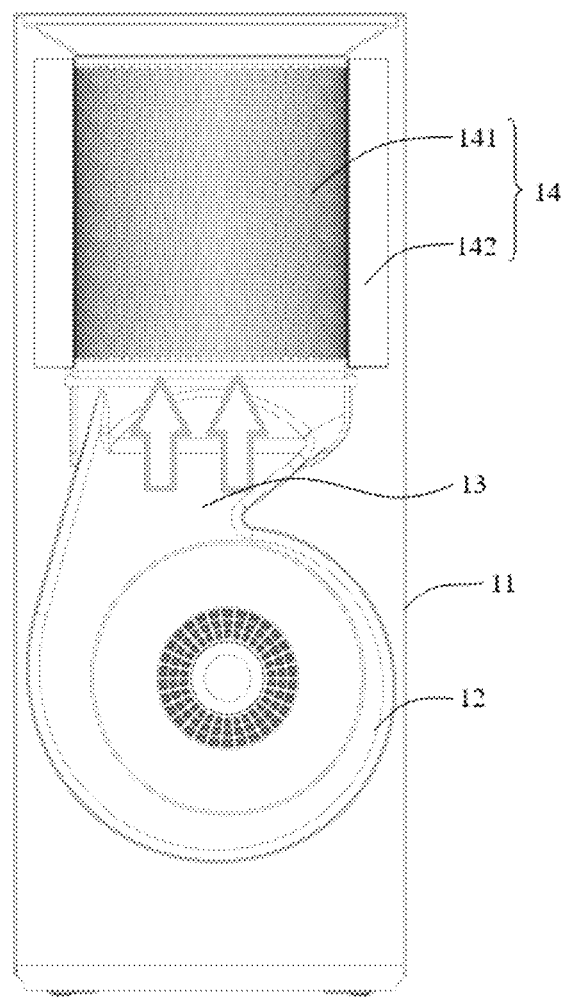
FIG. 4 is a schematic cross-section view illustrating a silencing device according to an example of the present disclosure.
Figure 5:
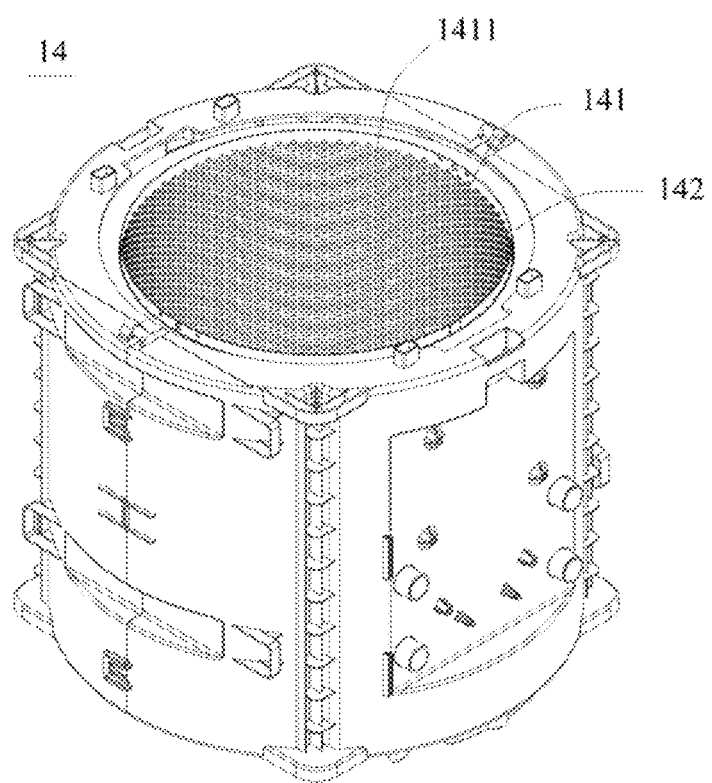
FIG. 5 is a diagram illustrating a structure of a part with a silencing device in an air purifier according to an example of the present disclosure.

As illustrated in FIGS. 4 and 5, according to another aspect of the present disclosure, an air purifier 100 is provided. The air purifier 100 includes a housing 11, an air inlet (not illustrated in the drawings), an air outlet (not illustrated in the drawings) and a fan module 12.

The air inlet is disposed in a peripheral lateral surface of a lower part of the housing 11. The air outlet is disposed in a top of the housing 11. An air duct structure 13 is disposed between the air inlet and the air outlet. The fan module 12 is located in the air duct structure 13. Specifically, the air outlet may be disposed in a top surface of the top of the housing 11, and may also be disposed in a lateral surface of the top of the housing 11. The fan module 12 may be arranged at a lower part of the housing 11. The type of the fan module 12 is not limited in the present disclosure, and for example, may be a centrifugal fan, a direct current fan or a turbo fan.

In one or more embodiments, a filtering device (not illustrated in the drawings) is also arranged in the housing 11. The fan module 12 may be located in an accommodation space in the filtering device. The filtering device is arranged at the lower part of the housing and corresponds to the air inlet, such that air in the air purifier 100 can flows through the filtering device at first. Here, all filtering devices applicable to the air purifier 100 are applicable to the filtering device of the present disclosure, and the filtering device will not be specifically limited herein.

Furthermore, the air purifier 100 further includes a silencing device 14 arranged in the air duct structure between the fan module 12 and the air outlet. The silencing device 14 is configured to reduce at least a frequency value, exceeding a sound wave frequency limit for the air purifier 100, of a sound wave spectrum in the air purifier 100, thereby achieving a purpose of noise reduction. Here, the structural parameters of the silencing device 14 include a mesh area of a sound insulation mesh plate 141, the volume of a silencing cotton 142 corresponding to each mesh 1411 and a depth of each mesh 1411.

Here, a sound wave frequency f absorbed by the silencing device 14 is equal to the frequency value, and the sound wave frequency f absorbed by the silencing device is expressed as $$f = \frac{C}{2\pi}\sqrt{\frac{A}{VL}}.$$

Here, C is a sound velocity in the air purifier 100, A is the mesh area of the sound insulation mesh plate 141, V is the volume of the silencing cotton 142 (which is obtained by dividing the volume of the silencing cotton 142 corresponding to all the meshes by the total number of the meshes) and L is the depth of each mesh (or a wall thickness of the sound insulation mesh plate). V is the volume of the silencing cotton 142 corresponding to each mesh 1411, which is obtained by dividing the volume of the silencing cotton 142 corresponding to all the meshes 1411 by the total number of all the meshes 1411. Preferably, the meshes 1411 in the sound insulation mesh plate 141 have the same mesh area and are uniformly distributed.

In one or more embodiments, the sound wave frequency f is closely related to the mesh area A, the depth L of each mesh and the volume V of the silencing cotton 142 corresponding to each mesh 1411. When there is made a requirement of absorbing different sound wave frequencies, different mesh areas A, different mesh depths L and different volumes V of the silencing cotton 142 corresponding to the meshes 1411 in the sound insulation mesh plate 141 may be set for adaptation, thereby achieving a purpose of noise reduction. For example, the mesh area A is ranged from $0.0625\pi mm^2$ to $100\ \pi mm^2$, the depth L of each mesh is ranged from 0.2 mm to 5 mm, and the thickness of the silencing cotton 142 is ranged from 0.1 mm to 100 mm. The volume of the silencing cotton 142 corresponding to each mesh 1411 is related to the number of the meshes 1411 and the thickness of the silencing cotton 142.

In an alternative embodiment, the sound insulation mesh plate 141 may be a plate body structure located in the air duct structure 13 of the air purifier 100, and the silencing cotton 142 is located on the side, which is opposite to the air duct structure 13, of the sound insulation mesh plate 141. Here, the airflow within the air duct structure 13 flows through a plate surface of the sound insulation mesh plate 141. That is, the sound insulation mesh plate 141 may be a structure such as a straight plate, a curve plate and a bent plate, and the sound insulation mesh plate 141 performs absorption noise treatment on the airflow in a certain direction on an inner wall of the air duct structure. Here, the meshes 1411 in the sound insulation mesh plate 141 may be round meshes, square meshes or polygonal meshes and are uniformly distributed in the sound insulation mesh plate 141. Therefore, the process is more convenient in perforation, and convenience is brought to machining.

In another alternative embodiment, the sound insulation mesh plate 141 is a closed structure, the silencing cotton 142 is positioned on an outer surface of the closed structure, an inner cavity of the closed structure forms a part of the air duct structure 13 of the air purifier 100, and an extending direction of a central axis of the sound insulation mesh plate 141 is the same as a flowing direction of air within the air duct structure 13. The multiple meshes 1411 are formed in the sound insulation mesh plate 141. Here, the sound insulation mesh plate 141 may be cylindrical, triangular prism-shaped, rectangular prism-shaped, polygonal prism-shaped or the like, the inner cavity of the sound insulation mesh plate 141 forms a part of the air duct structure 13, and the meshes 1411 in the sound insulation mesh plate 141 may be round meshes, square meshes or polygonal meshes and are uniformly distributed in the sound insulation mesh plate 141. Therefore, the process is more convenient in perforation, and convenience is brought to machining. The embodiment has a better silencing effect, and the embodiment is preferably adopted in the present disclosure.

In the present disclosure, since a sound is propagated from bottom to top and the sound insulation mesh plate 141 is located in the air duct structure 13, a capability of the silencing device 14 in absorbing the sound wave frequency f may further be improved by increasing the number of the meshes in the sound insulation mesh plate 141 and/or increasing the stroke of the sound insulation mesh plate 141 in the air duct structure 13 on the premise of meeting an application environment (i.e., a height limit due to the air purifier 100). Here, the height of the sound insulation mesh plate 141 is ranged from 50 mm to 500 mm.

The present disclosure designs the method for producing the silencing device, the silencing device and the air purifier with the silencing device, and the silencing device capable of reducing the frequency value exceeding the sound wave frequency limit is produced according to the frequency value exceeding the sound wave frequency limit to implement noise reduction treatment in the air purifier.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be defined by the appended claims.

What is claimed is:

1. A method for producing a silencing device, comprising:
  acquiring a sound wave spectrum when an air purifier to be silenced performs operations;
  calculating a frequency value within the sound wave spectrum, which exceeds a sound wave frequency limit for the air purifier;
  producing a silencing device adapted to the air purifier according to the frequency value, wherein at least one structural parameter of the silencing device is configured according to the frequency value, wherein the silencing device is configured to reduce a sound with the frequency value exceeding the sound wave frequency limit, the silencing device comprises a sound insulation mesh plate and silencing cotton attached to the sound insulation mesh plate, and a plurality of meshes are in the sound insulation mesh plate, and a sound wave frequency f absorbed by the silencing device is equal to the frequency value, and wherein the at least one structural parameter of the silencing device comprises a mesh area of the sound insulation mesh plate, a silencing cotton volume corresponding to the mesh and a depth of the mesh; and setting the mesh area of the sound insulation mesh plate, the depth of the mesh and the silencing cotton volume corresponding to the mesh according to a requirement of absorbing different sound wave frequencies.

2. The method of claim 1, wherein the sound wave frequency f $$f = \frac{C}{2\pi}\sqrt{\frac{A}{VL}},$$

absorbed by the silencing device is where C is a sound velocity in the air purifier, A is the mesh area of the sound insulation mesh plate, V is the silencing cotton volume corresponding to the mesh, and L is the depth of the mesh.

3. The method of claim 2, wherein the mesh area A is ranged from 0.0625 πmm² to 100 πmm², the depth L of the mesh is ranged from 0.2 mm to 5 mm, and a thickness of the silencing cotton is ranged from 0.1 mm to 100 mm.

4. A silencing device, comprising:
a sound insulation mesh plate; and
silencing cotton attached to the sound insulation mesh plate,
wherein the sound insulation mesh plate comprises a plurality of meshes, and the silencing cotton is located on an air outlet side of each mesh, wherein the sound insulation mesh plate and the silencing cotton is cooperatively configured to reduce a sound with the frequency value which exceeds the sound wave frequency limit for an air purifier attached to the silencing device,
wherein at least one structural parameter of the silencing device comprises a mesh area of the sound insulation mesh plate, a silencing cotton volume corresponding to the mesh and a depth of the mesh, and
the mesh area of the sound insulation mesh plate, the depth of the mesh and the silencing cotton volume corresponding to the mesh are set according to a requirement of absorbing different sound wave frequencies.

5. The silencing device of claim 4, wherein a sound wave frequency $$f = \frac{C}{2\pi}\sqrt{\frac{A}{VL}},$$

f absorbed by the silencing device is equal to the frequency value, and f is where C is a sound velocity in the air purifier, A is the mesh area of the sound insulation mesh plate, V is a silencing cotton volume corresponding to the mesh, and L is a depth of the mesh.

6. The silencing device of claim 4, wherein the mesh area A is ranged from 0.0625 πmm² to 100 πmm², the depth L of the mesh is ranged from 0.2 mm to 5 mm, and a thickness of the silencing cotton is ranged from 0.1 mm to 100 mm.

7. The silencing device of claim 4, wherein the sound insulation mesh plate is a plate body structure located in an air duct structure of the air purifier, and the silencing cotton is located on a side, which is opposite to the air duct structure, of the sound insulation mesh plate, wherein an airflow within the air duct structure flows through a plate surface of the sound insulation mesh plate.

8. The silencing device of claim 4, wherein the sound insulation mesh plate is a closed structure, the silencing cotton is positioned on an outer surface of the closed structure, an inner cavity of the closed structure forms a part of the air duct structure of the air purifier, and an extending direction of a central axis of the sound insulation mesh plate is the same as a flowing direction of air within the air duct structure.

9. An air purifier, comprising:
a housing, an air inlet, an air outlet, a fan module and a silencing device, wherein the silencing device comprises: a sound insulation mesh plate and silencing cotton attached to the sound insulation mesh plate, wherein a plurality of meshes are in the sound insulation mesh plate, and the silencing cotton is located on an air outlet side of each mesh, wherein the sound insulation mesh plate and the silencing cotton is cooperatively configured to reduce a sound with the frequency value which exceeds the sound wave frequency limit for the air purifier,
wherein the air inlet is disposed in a peripheral lateral surface of a lower part of the housing, the air outlet is disposed in a top of the housing, an air duct structure is disposed between the air inlet and the air outlet, the fan module is located in the air duct structure, the silencing device is mounted within the air duct structure between the fan module and the air outlet,
wherein at least one structural parameter of the silencing device comprises a mesh area of the sound insulation mesh plate, a silencing cotton volume corresponding to the mesh and a depth of the mesh, and
the mesh area of the sound insulation mesh plate, the depth of the mesh and the silencing cotton volume corresponding to the mesh are set according to a requirement of absorbing different sound wave frequencies.

10. The air purifier of claim 9, wherein a sound wave frequency f $$f = \frac{C}{2\pi}\sqrt{\frac{A}{VL}},$$

absorbed by the silencing device is equal to the frequency value, and f is where C is a sound velocity in the air purifier, A is the mesh area of the sound insulation mesh plate, V is a silencing cotton volume corresponding to the mesh, and L is a depth of the mesh.

11. The air purifier of claim 9, wherein the mesh area A is ranged from 0.0625 πmm² to 100 πmm², the depth L of the mesh is ranged from 0.2 mm to 5 mm, and a thickness of the silencing cotton is ranged from 0.1 mm to 100 mm.

12. The air purifier of claim 9, wherein the sound insulation mesh plate is a plate body structure located in an air duct structure of the air purifier, and the silencing cotton is located on a side, which is opposite to the air duct structure, of the sound insulation mesh plate, wherein an airflow within the air duct structure flows through a plate surface of the sound insulation mesh plate.

13. The air purifier of claim 9, wherein the sound insulation mesh plate is a closed structure, the silencing cotton is positioned on an outer surface of the closed structure, an inner cavity of the closed structure forms a part of the air duct structure of the air purifier, and an extending direction of a central axis of the sound insulation mesh plate is the same as a flowing direction of air within the air duct structure.

\* \* \* \* \*